United States Patent
Williams

(10) Patent No.: US 11,958,340 B2
(45) Date of Patent: Apr. 16, 2024

(54) VEHICLE AIR FILTRATION SYSTEM

(71) Applicant: AEM Induction Systems, Riverside, CA (US)

(72) Inventor: Steve Williams, Cherry Valley, CA (US)

(73) Assignee: AEM Induction System, Riverside, CA (US)

(*) Notice: Subject to any disclaimer, the term of this patent is extended or adjusted under 35 U.S.C. 154(b) by 631 days.

(21) Appl. No.: 16/714,538

(22) Filed: Dec. 13, 2019

(65) Prior Publication Data

US 2020/0189362 A1 Jun. 18, 2020

Related U.S. Application Data

(60) Provisional application No. 62/779,721, filed on Dec. 14, 2018.

(51) Int. Cl.
*B60H 3/06* (2006.01)
*F02M 35/02* (2006.01)

(52) U.S. Cl.
CPC ....... *B60H 3/0616* (2013.01); *F02M 35/0205* (2013.01); *B60H 2003/065* (2013.01)

(58) Field of Classification Search
CPC ......... B01D 46/0002; F02M 35/02416; F02M 35/0201; B60R 21/34; B60R 2021/343
USPC ...... 55/385.3, 481, 493, 498, 497, 500, 502, 55/503; 123/198 E
See application file for complete search history.

(56) References Cited

U.S. PATENT DOCUMENTS

| | | | | |
|---|---|---|---|---|
| 5,554,205 A * | 9/1996 | Ernst | .................... | B01D 46/521 55/497 |
| 5,640,937 A * | 6/1997 | Slopsema | ............ | B01D 46/521 55/385.3 |
| 5,655,497 A * | 8/1997 | Nakajima | ............... | F02B 75/22 55/385.3 |
| 5,937,816 A * | 8/1999 | Wincewicz | ............ | F02M 25/06 123/195 A |
| 6,802,556 B2 * | 10/2004 | Mattsson | ................ | B60R 21/38 180/274 |
| 7,597,384 B2 * | 10/2009 | Wallman | ................. | B60R 21/34 296/193.11 |
| 8,002,863 B2 * | 8/2011 | Kubo | ..................... | F02M 35/04 55/498 |
| 9,574,527 B2 * | 2/2017 | Fischer | .............. | F02M 35/0201 |
| 2009/0101558 A1 * | 4/2009 | Wang | ................. | B01D 46/0031 210/188 |

* cited by examiner

*Primary Examiner* — Minh Chau T Pham
(74) *Attorney, Agent, or Firm* — Rutan & Tucker LLP; Hani Z. Sayed

(57) ABSTRACT

An air box and methods are provided for communicating an airstream through an air filter to an air intake duct of an internal combustion engine of a vehicle. The air box generally transports air received by way of air inlet ports that mate with aerodynamic elements of the vehicle. The air is received through a conduit to an air intake duct of the engine. The air box an enclosure that is formed in a substantially rigid/solid form. A substantially transparent inspection region is disposed on a surface of the enclosure so that the air filter may be viewed and potentially accessed if desired.

16 Claims, 4 Drawing Sheets

US 11,958,340 B2

VEHICLE AIR FILTRATION SYSTEM

PRIORITY

This application claims the benefit of and priority to U.S. Provisional Application, entitled "Vehicle Air Filtration System," filed on Dec. 14, 2018 and having application Ser. No. 62/779,721.

FIELD

The field of the present disclosure generally relates to filtration devices. More particularly, the field of the present disclosure relates to an apparatus and a method for a vehicle air filtration system which exhibits an improved air flow and may be coupled with a reusable air filter so as to improve engine performance and fuel economy.

BACKGROUND

An air filter designed to remove particulate is generally a device composed of fibrous materials. These fibrous materials may remove solid particulates such as dust, pollen, mold, and bacteria from the air. Air filters are used in applications where air quality is important, notably in building ventilation systems and with engines.

Air filters may be used in automobiles, trucks, tractors, locomotives, and other vehicles that use internal combustion engines. Air filters may be used with gasoline engines, diesel engines, or other engines that run on fossil fuels or other combustible substances. Air filters may be used with engines in which combustion is intermittent, such as four-stroke and two-stroke piston engines, as well as other types of engines that take in air so that a combustible substance may be burned. For example, air filters may be used with some gas turbines. Filters may also be used with air compressors or in other devices that take in air.

Filters may be made from pleated paper, foam, cotton, spun fiberglass, or other known filter materials. Generally, the air intakes of internal combustion engines and compressors tend to use paper, foam, or cotton filters. Some filters use an oil bath. Air filters for internal combustion engines prevent abrasive particulate matter from entering the combustion cylinders of the engine, wherein the particulate matter would cause mechanical wear and oil contamination. Many fuel injected engines utilize a flat panel, pleated paper filter element. This filter usually is placed inside an enclosed, plastic air box connected to a throttle body by way of ductwork. Vehicles that use carburetors or throttle body fuel injection systems typically use a cylindrical air filter positioned above the carburetor or the throttle body.

A drawback to conventional air boxes that require flat panel paper filters is that as particular matter builds up in the filter, air flow through the filter becomes restricted. Such a restricted air flow generally leads to a reduction in engine performance, such as a decrease in engine power output and a greater fuel consumption. Moreover, as the paper filter becomes increasingly clogged, pressure below the filter decreases while the atmospheric air pressure outside the filter remains the same. When the difference in pressure becomes too great, contaminants may be drawn through the paper filter directly into the engine. Thus, the ability of the paper filter to protect the engine from contamination and internal damage tends to decrease near the end of the filter's service life. Typically, paper air filters are removed from the vehicle and discarded, and a new paper air filter is then installed. Considering that there are millions of vehicles throughout the world, the volume of discarded air filters that could be eliminated from landfills is a staggering number.

Another drawback to conventional air boxes is that they typically enclose the filter within an interior cavity, thereby requiring removal of the filter and the air box to inspect the filter. What is needed, therefore, is an air box that exhibits improved air flow and may be coupled with a reusable air filter so as to improve engine performance and fuel economy, without requiring complete removal of the air box.

SUMMARY

An air box and methods are provided for communicating an airstream through an air filter to an air intake duct of an internal combustion engine of a vehicle. The air box generally transports air received by way of air inlet ports that mate with aerodynamic elements of the vehicle. The airstream is directed through a conduit to an air intake duct of the engine. The air box comprises an enclosure that is formed in a substantially rigid/solid form. A substantially transparent inspection region is disposed on a surface of the enclosure so that the air filter may be viewed and potentially accessed if desired.

In an exemplary embodiment, an air box for communicating an airstream from one or more aerodynamic elements of a vehicle to an air intake duct of an engine comprises: an enclosure configured to support the air filter within an interior of the enclosure; one or more air inlets that are configured to receive the airstream from one or more air inlet ports; a duct configured to direct the airstream from the one or more air inlets to the interior of the enclosure; a transparent inspection region that is disposed on a surface of the enclosure, configured so that the air filter may be viewed; and a conduit configured to communicate the airstream from an interior of the air filter to the air intake duct.

In another exemplary embodiment, a multiplicity of supports are disposed on the enclosure and configured to facilitate fixedly coupling the air box with the engine. In another exemplary embodiment, the multiplicity of supports are configured to cooperate with any of various mounts and pads disposed within the engine bay.

In another exemplary embodiment, each of the one or more air inlets comprises an opening that is configured to be coupled with a corresponding one of the one or more air inlet ports, such that the airstream is passed through the one or more air inlets and into the duct. In another exemplary embodiment, a gasket is disposed around a perimeter edge of each of the one or more air inlets and configured to establish a substantially air-leak resistant junction between the one or more air inlets and the one or more air inlet ports. In another exemplary embodiment, the enclosure is comprised of a flat surface that is configured to receive a base of the air filter, the base comprising a seal that is configured to be compressed so as to establish an air-leak resistant connection between the base and the flat surface.

In another exemplary embodiment, the transparent inspection region includes a window that may be comprised of a transparent material. In another exemplary embodiment, the transparent material comprises one of glass, plastic, and Plexiglas. In another exemplary embodiment, a plurality of transparent inspection regions are disposed on a surface of the enclosure.

In an exemplary embodiment, a method for an air box to communicate an airstream from one or more aerodynamic elements of a vehicle to an air intake duct of an engine comprises: configuring an enclosure to support the air filter within an interior of the enclosure; disposing a transparent inspection region on a surface of the enclosure such that the air filter may be viewed; configuring one or more air inlets to receive the airstream from one or more air inlet ports; directing the airstream from the one or more air inlets to the interior of the enclosure by way of a duct; and configuring a conduit to communicate the airstream from an interior of the air filter to the air intake duct.

In another exemplary embodiment, configuring the enclosure includes disposing a multiplicity of supports on the enclosure to facilitate fixedly coupling the air box with the engine. In another exemplary embodiment, disposing the multiplicity of supports includes configuring the supports to cooperate with any of various mounts and pads disposed within the engine bay. In another exemplary embodiment, configuring the enclosure includes configured a flat surface to receive a base of the air filter, the base comprising a seal that is configured to be compressed so as to establish an air-leak resistant connection between the base and the flat surface.

In another exemplary embodiment, disposing a transparent inspection region comprises forming a window in the enclosure. In another exemplary embodiment, forming includes using a transparent material comprising one of glass, plastic, and Plexiglas. In another exemplary embodiment, configuring one or more air inlets includes disposing a gasket around a perimeter edge of each of the one or more air inlets to establish a substantially air-leak resistant junction between the one or more air inlets and the one or more air inlet ports.

BRIEF DESCRIPTION OF THE DRAWINGS

The drawings refer to embodiments of the present disclosure in which.

Figure 1:
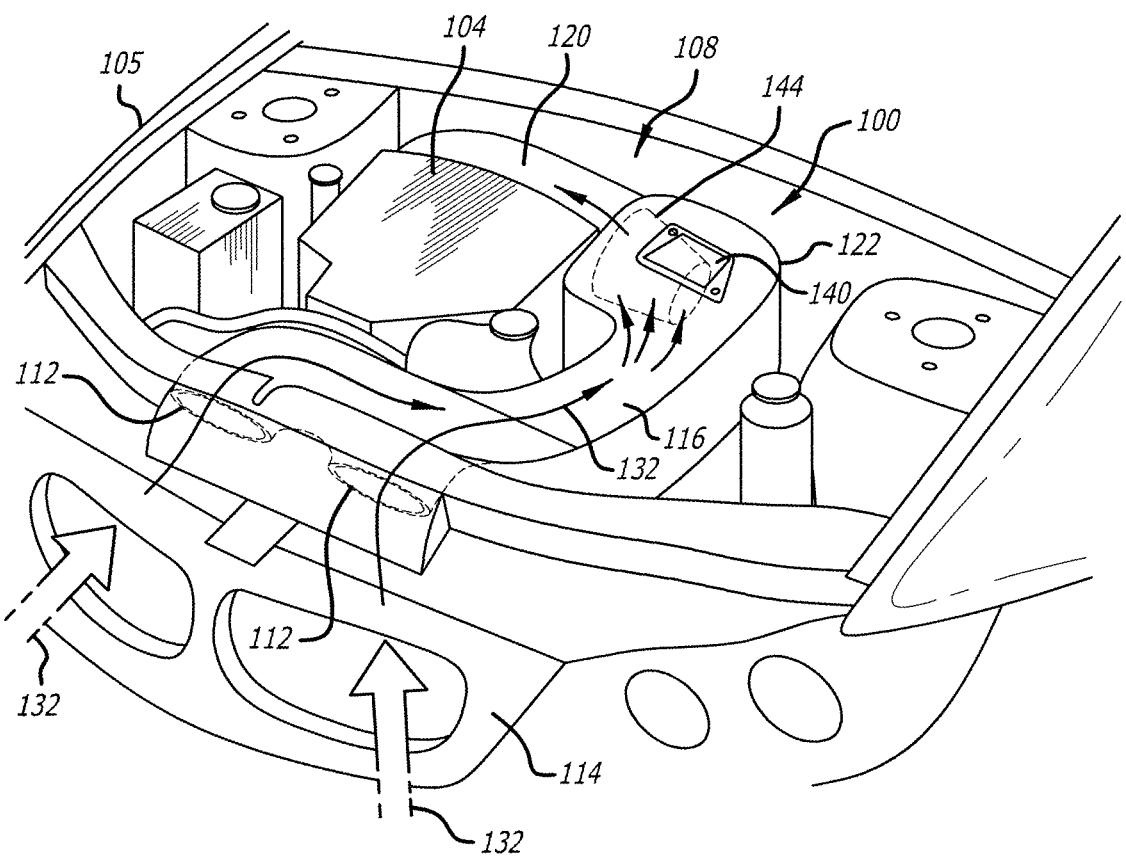
FIG. 1 illustrates a perspective view of an engine bay wherein an exemplary embodiment of an air box is coupled with an engine, according to the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first air inlet," may be made. However, the specific numeric reference should not be interpreted as a literal sequential order but rather interpreted that the "first air inlet" is different than a "second air inlet." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for an air box configured to communicate an airstream through an air filter to an air intake duct of an internal combustion engine of a vehicle. The air box is comprised of an enclosure that is configured to support the air filter within an interior of the enclosure. A base portion is disposed on the enclosure and configured to fixedly receive a base of the air filter. Hardware fasteners may be coupled with the base of the air filter to affix the air filter to a surface of the mount portion. The enclosure features one or more inlet ducts that are configured to mate with aerodynamic features of the vehicle so as to pass cold air there through. The inlet ducts may feature rubber gaskets so as to ensure a leak-free connection with respect to the vehicle's aerodynamic features. A substantially transparent inspection region is disposed on a surface of the enclosure so that the air filter may be viewed.

In one embodiment, an air box is disclosed that is configured to communicate an airstream from one or more aerodynamic elements of a vehicle to an air intake duct of an engine, comprising: an enclosure configured to support the air filter within an interior of the enclosure; one or more air inlets that are configured to receive the airstream from the one or more air inlet ports; a duct configured to direct the airstream from the one or more air inlets to the interior of the enclosure; a transparent inspection region that is disposed on a surface of the enclosure, and configured so that the air filter may be viewed; and a conduit configured to communicate the airstream from an interior of the air filter to the air intake duct. In one embodiment, the inspection region may be disposed on the air box, albeit raised significantly from the surface of the air box for various design or functional purposes.

In one embodiment, a multiplicity of supports are disposed on the enclosure and configured to facilitate fixedly coupling the air box with the engine, the multiplicity of protrusions being configured to cooperate with any of various mounts and pads disposed within the engine bay. In another embodiment, each of the one or more air inlets comprises an opening that is configured to be coupled with a corresponding one of the one or more air inlet ports, such that the airstream is passed through the one or more air inlets and into the duct.

In one embodiment, a gasket is disposed around a perimeter edge of each of the one or more air inlets and configured to establish a substantially air-leak resistant junction between the one or more air inlets and the one or more air inlet ports. In one embodiment, the enclosure is comprised of a flat surface that is configured to receive a base of the air filter, the base being comprised of a seal that is configured to be compressed so as to establish an air-leak resistant connection between the base and the flat surface.

In another embodiment, the inspection region includes a window that may be comprised of a transparent material. In yet another embodiment, the transparent material comprises one of glass, plastic, and Plexiglas. In one embodiment, a plurality of inspection regions are disposed on a surface of the enclosure. The thickness of the window may vary in depth, depending on the application. In one embodiment, the window is capable of being removed and replaced.

Although embodiments of the invention may be described and illustrated herein in terms of a cone-shaped air filter, it should be understood that embodiments of this invention are not limited to the exact shape illustrated, but rather may include a wide variety of generally enclosed shapes, such as cylindrical, circular, oval, round, curved, conical, or any other closed perimeter shape, that provide a relatively large surface area in a given volume of the filter. In embodiments, even multiple intakes are contemplated as being housed within the enclosure, for example.

Moreover, embodiments as described herein are not limited to use as internal combustion engine filters, but rather may have applicability in other filtration systems in which a large volume of air requires treatment. Indeed, it should also be understood that due to the significant variance in shape and size of various vehicles, the enclosure of the air box may appear significantly different than the drawings described herein, without exceeding beyond the spirit and scope of the present disclosure.

FIG. 1 illustrates an exemplary embodiment of an air box 100 that is coupled with an engine 104 within an engine bay 108 of a vehicle 105. The air box 100 generally transports air received by way of air inlet ports 112 that mate with aerodynamic elements 114 of the vehicle. The air is received through a conduit 116 to an air intake duct 120 of the engine 104. As will be recognized, the air inlet ports 112 generally extend through the vehicle to a source of external air, such as a front of the vehicle. The air box 100 comprises an enclosure 122 that is formed in a substantially rigid/solid form. The enclosure 122 may be comprised of any number of materials, including by way of non-limiting example, carbon fiber, polyurethane, various plastics, metals, or any combination of materials as well. A substantially transparent inspection region 160 is disposed on a surface of the enclosure 122 so that the air filter may be viewed.

As shown, the air box 100 includes an air filter 144 that is disposed within the interior 140 of the air box 100. The air filter 144 is configured to remove particulate matter and contaminants that may be flowing with the airstream 132 before the airstream 132 is directed through the conduit 116 to the air intake duct 120 of the engine 104. The air box 100 generally is of an enclosed variety and is configured to improve movement of the airstream 132 through the air filter 144 disposed within the interior 140 of the enclosure 122. Preferably, the interior 140 is characterized by smooth surfaces and rounded edges so as to decrease turbulence and air resistance through the air box 100, thereby improving performance of the engine 104 beyond that otherwise possible with conventional air boxes. The enclosure 122 is preferably comprised of a material that is sufficiently durable and temperature resistant to retain its configurations during installation and operation when coupled with the air intake duct 120 of the engine 104. In some embodiments, the enclosure 122 may be formed as a single component by way of injection molding.

In some embodiments, one or more supports 124 may be disposed on the enclosure 122 so as to couple the air box 100 within the engine bay 108, as shown in FIG. 1, for example. The supports 124 may be configured to couple the air box 100 directly with the engine 104 of the vehicle. It is envisioned that the supports 124 may include any suitable fastening means to facilitate installing the air box 100 in the engine bay 108, such as, by way of example, suitably designed holes, brackets, molded shaped portions, protrusions, extensions, straps, hardware fasteners, or any other similar device for holding the air box 100 fixed within the engine bay 108. As will be appreciated, the particular fastening means will vary according to the specific make, model, and type of the vehicle with which the air box 100 is to be used. In one embodiment, a multiplicity of supports 124 are disposed on the enclosure 122 and configured to facilitate fixedly coupling the air box 100 with the engine 104, the multiplicity of supports being configured to cooperate with any of various mounts and pads disposed within the engine bay.

Figure 2:
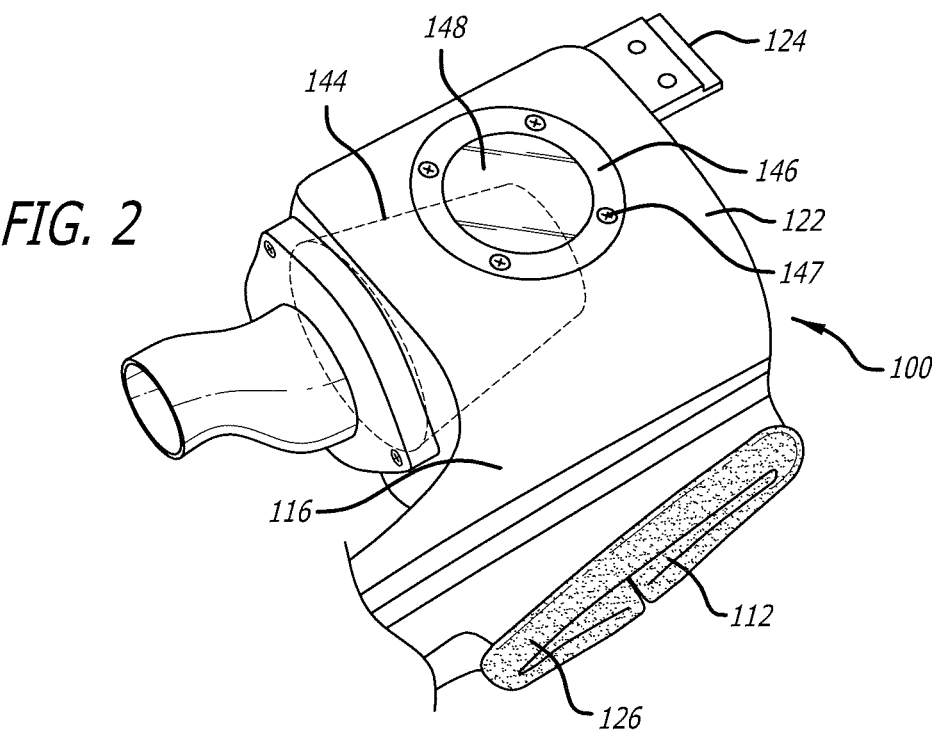
FIG. 2 illustrates an upper perspective view of an exemplary embodiment of an air box in accordance with the present disclosure.

FIG. 2 illustrates a perspective view of an exemplary embodiment of the air filter 144 disposed within the air box 100. As best illustrated in FIG. 2, a substantially transparent inspection region 160 is disposed on a surface of the enclosure 122 so that the air filter 144 may be viewed. In one embodiment, the inspection region 160 comprises a mounting section 146 that includes a plurality of fasteners 147. It is envisioned that the fasteners 147 may be used to attach the inspection region 160 to the enclosure 122. The inspection region 160 includes a window 148 that may be comprised of any substantially transparent material, including without limitation, glass, plastic, or various combinations thereof. It will be appreciated that by including the inspection region 160, the air filter 144 may be viewed without requiring complete uninstallation of the air box 100.

Accordingly, the vehicle owner will be able to determine if the air filter 144 requires cleaning, or replacement, for example. Although the inspection region 160 is shown in a generally annular configuration, it should be understood that the exact size and shape thereto may be substantially varied. For example, in one embodiment, the inspection region 160 is proportioned such that an unencumbered view of the filtering region of the air filter 144 may be realized. In one embodiment, a plurality of inspection regions 160 may be disposed on the enclosure 122.

In the embodiments illustrated in FIGS. 1-4, a gasket 126 may be disposed around a perimeter edge of each of the air inlet ports 112. The gasket 126 serves to establish a substantially air-leak connection point between the air inlet port 112 and the aerodynamic regions 114. In some embodiments, the gasket 196 is comprised of a pliable rubber. The gasket 126 may be comprised of any cross-sectional shape that is suitable for sealing the junction between the aerodynamic regions 114 and the air inlet port 112. It is contemplated that a wide variety of peripheral components may be coupled with the enclosure 122, as needed. In some embodiments, for example, one or more sheet metal components may be fastened onto locations of the enclosure 122 that are near heated components within the engine bay 108, such as an exhaust manifold of the engine 104. In some embodiments, one or more pliable pads may be strategically located on the exterior of the enclosure 122 so as to cushion contact with nearby components within the engine bay 108.

Figure 3A:
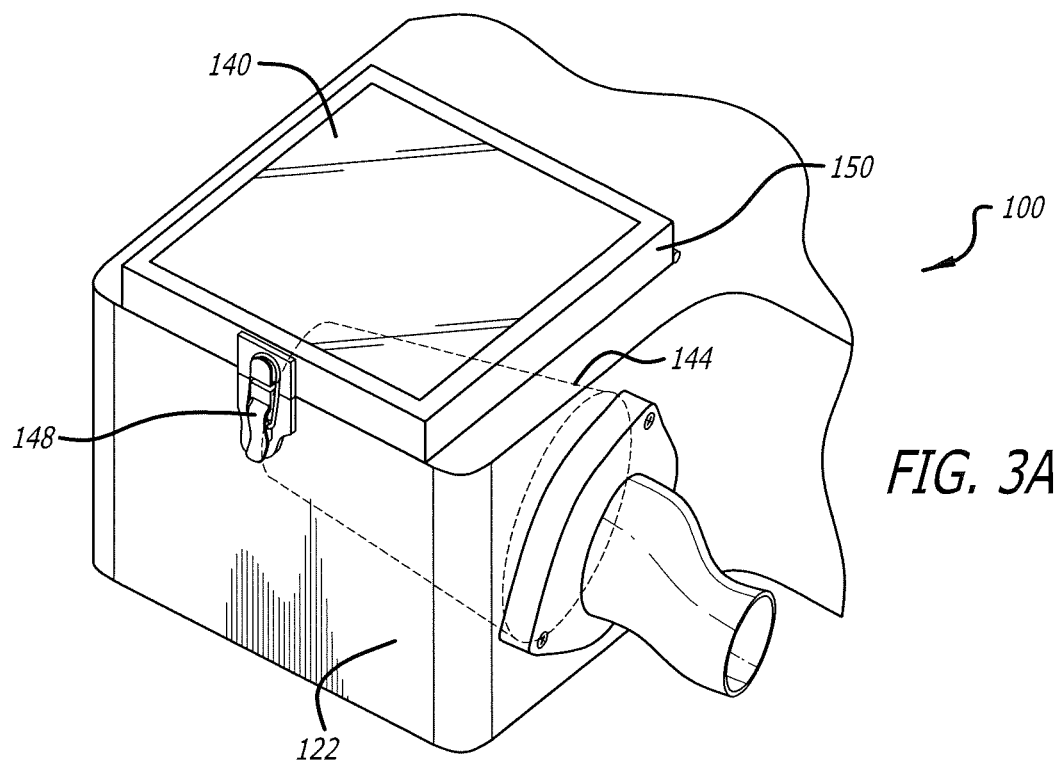
FIG. 3A illustrates an upper perspective view of an exemplary embodiment of an air box access system that includes a panel to allow access to an air filter.
Figure 3B:
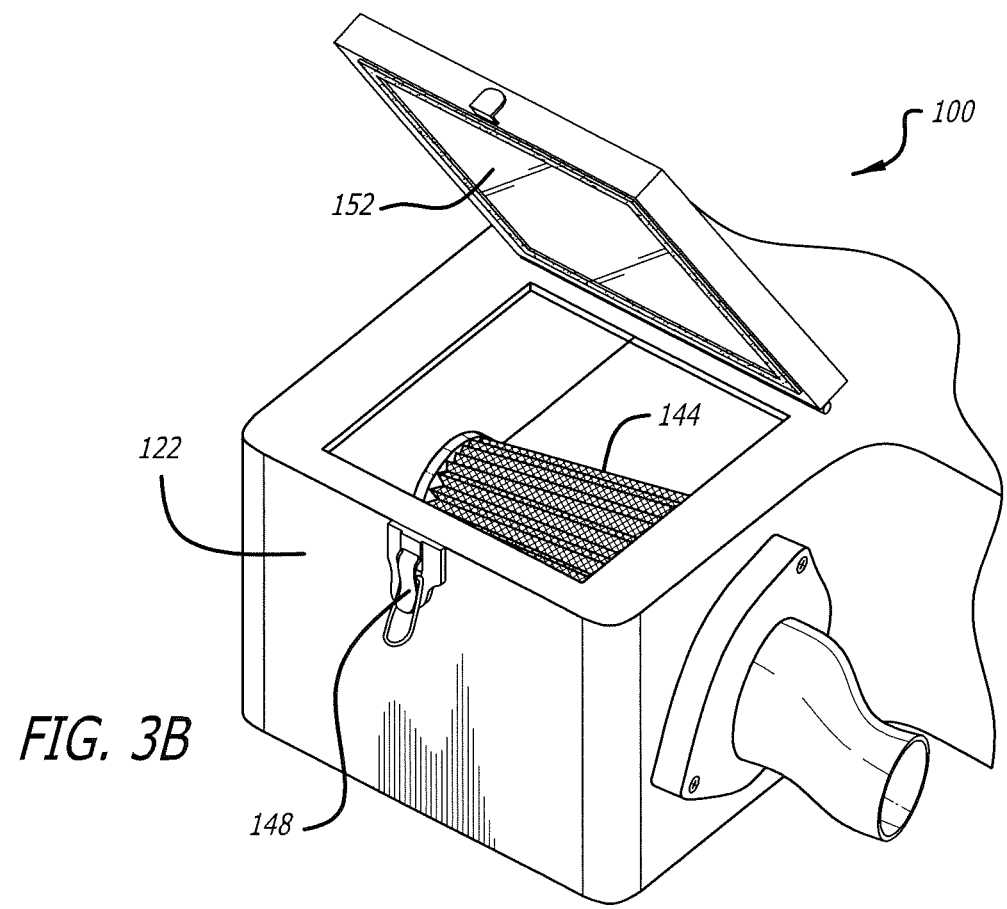
FIG. 3B illustrates an upper perspective view of the air box access system of FIG. 3A with the panel in an open configuration whereby the air filter may be accessed.

FIG. 3A-3B illustrate an upper perspective view of an exemplary embodiment of an air box access system in accordance with the present disclosure. As shown, a panel 150 may be disposed on a face of the enclosure 122, so as to allow easy access to the air filter 144. In one embodiment, the panel 150 may include an inspection region 160 as described herein. As shown, the panel 150 may comprise a plurality of hinges (not shown) that allow for opening and closing of the panel 150. In one embodiment, a locking mechanism 149 may be included so as to provide an air-tight seal with respect to the enclosure 122. In one embodiment, the panel 150 may include a gasket 152 that is disposed on an interior portion thereto.

Figure 4:
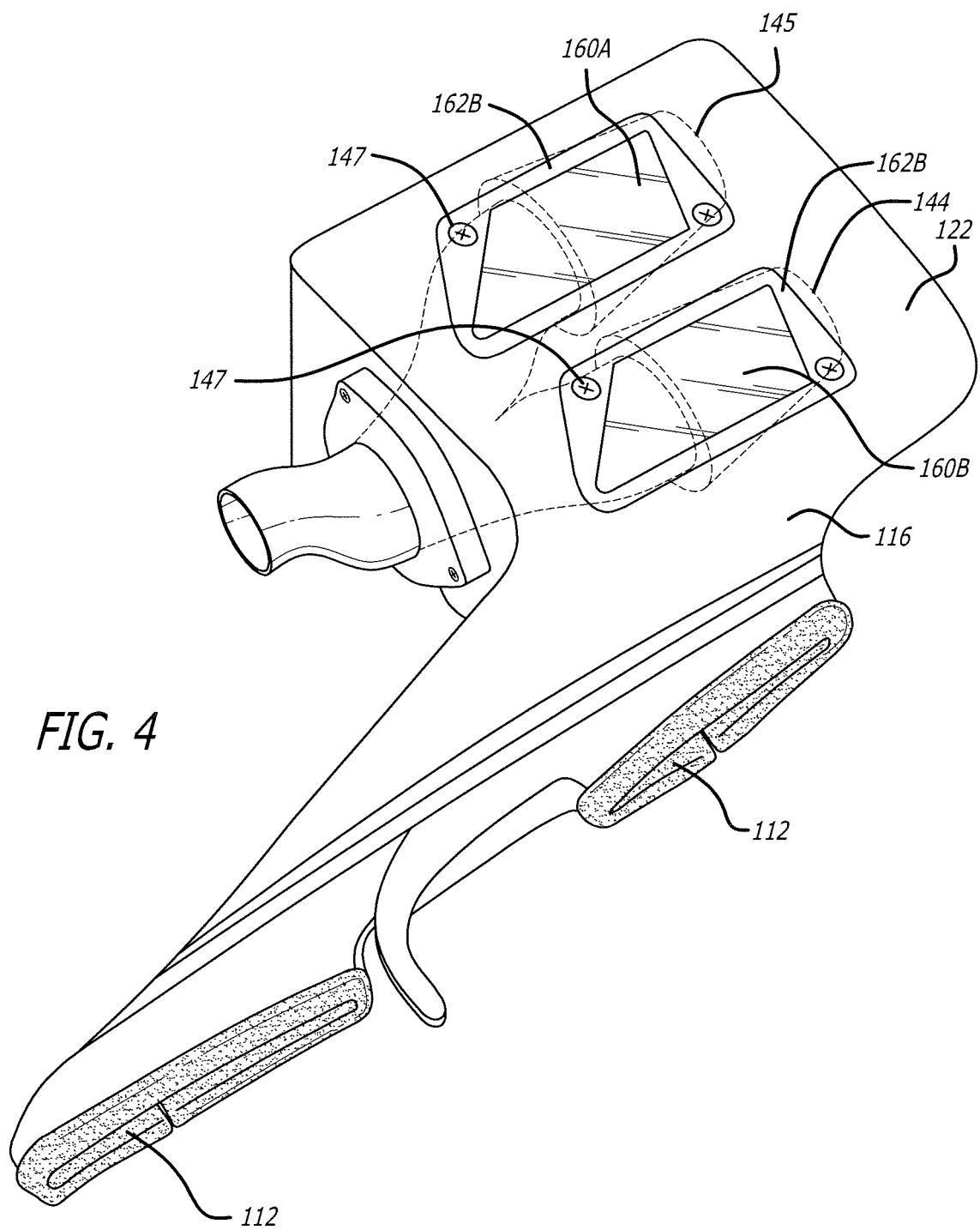
FIG. 4 illustrates an upper perspective view of an exemplary embodiment of an air box access system in accordance with the present disclosure.

FIG. 4 illustrates an upper perspective view of an exemplary embodiment of an air box access system in accordance with the present disclosure, that is substantially similar to the embodiments discussed herein. As shown, however, the air box 100 houses a filtration system comprising multiple filters 144, 145. The air box 100 generally transports air received by way of air inlet ports 112 that mate with aerodynamic elements 114 of the vehicle. The air is received through conduit 116 to an air intake duct 120 of the engine 104. A plurality of substantially transparent inspection regions 160A, 160B are disposed on a surface of the enclosure 122 so that the air filters may be viewed. Each of the inspection regions 160A, 160B comprise one or more fasteners 147, as indicated herein. In one embodiment, the inspection regions may comprise a plate 162B that is coupled with the inspection regions 160A, 160B. It is envisioned that one could access the filters 144, 145 by removing the one or more fasteners 147 that couple the plates 162B to the enclosure 122. Although only two inspection regions are shown, it should be understood that any number of inspection regions could be utilized depending on the application. Moreover, the exact configuration, location, size and dimensions of the inspection regions 160A, 160B and the plates 162B may be varied without limitation.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An air box for communicating an airstream from one or more aerodynamic elements of a vehicle to an air intake duct of an engine, the air box comprising:
   an enclosure configured to support the air filter within an interior of the enclosure;
   one or more air inlets that are configured to receive the airstream from one or more air inlet ports;
   a gasket disposed around a perimeter edge of each of the one or more air inlets;
   a duct configured to direct the airstream from the one or more air inlets to the interior of the enclosure;
   a panel coupled with the enclosure to allow access to the air filter, the panel including a plurality of hinges that allow for opening and closing of the panel;
   a locking mechanism and a gasket for providing an air-tight seal between the panel and the enclosure;
   a transparent inspection region that comprises the panel and is configured so that the air filter may be viewed; and
   a conduit configured to communicate the airstream from an interior of the air filter to the air intake duct.

2. The air box of claim 1, wherein a multiplicity of supports are disposed on the enclosure and configured to facilitate fixedly coupling the air box with the engine.

3. The air box of claim 2, wherein the multiplicity of supports are configured to cooperate with any of various mounts and pads disposed within the engine bay.

4. The air box of claim 1, wherein each of the one or more air inlets comprises an opening that is configured to be coupled with a corresponding one of the one or more air inlet ports, such that the airstream is passed through the one or more air inlets and into the duct.

5. The air box of claim 1, wherein the gasket is configured to establish a substantially air-leak resistant junction between the one or more air inlets and the one or more air inlet ports.

6. The air box of claim 1, wherein the enclosure is comprised of a flat surface that is configured to receive a base of the air filter, the base comprising a seal that is configured to be compressed so as to establish an air-leak resistant connection between the base and the flat surface.

7. The air box of claim 1, wherein the transparent inspection region includes a window that may be comprised of a transparent material.

8. The air box of claim 7, wherein the transparent material comprises one of glass, plastic, and Plexiglas.

9. The air box of claim 1, wherein a plurality of transparent inspection regions are disposed on a surface of the enclosure.

10. A method for an air box to communicate an airstream from one or more aerodynamic elements of a vehicle to an air intake duct of an engine, the method comprising:
    configuring an enclosure to support the air filter within an interior of the enclosure;
    coupling a panel with the enclosure to allow access to the air filter, the panel including a plurality of hinges that allow for opening and closing of the panel;
    forming an air-tight seal between the panel and the enclosure by way of a locking mechanism and a gasket;
    disposing a transparent inspection region on the panel such that the air filter may be viewed;
    configuring one or more air inlets to receive the airstream from one or more air inlet ports;
    disposing a gasket around a perimeter edge of each of the one or more air inlets;
    directing the airstream from the one or more air inlets to the interior of the enclosure by way of a duct; and
    configuring a conduit to communicate the airstream from an interior of the air filter to the air intake duct.

11. The method of claim 10, wherein configuring the enclosure includes disposing a multiplicity of supports on the enclosure to facilitate fixedly coupling the air box with the engine.

12. The method of claim 11, wherein disposing the multiplicity of supports includes configuring the supports to cooperate with any of various mounts and pads disposed within the engine bay.

13. The method of claim 10, wherein configuring the enclosure includes configured a flat surface to receive a base of the air filter, the base comprising a seal that is configured to be compressed so as to establish an air-leak resistant connection between the base and the flat surface.

14. The method of claim 10, wherein disposing a transparent inspection region comprises forming a window in the panel.

15. The method of claim 14, wherein forming includes using a transparent material comprising one of glass, plastic, and Plexiglas.

16. The method of claim 10, wherein disposing the gasket includes establishing a substantially air-leak resistant junction between the one or more air inlets and the one or more air inlet ports.

* * * * *